United States Patent Office 2,910,482
Patented Oct. 27, 1959

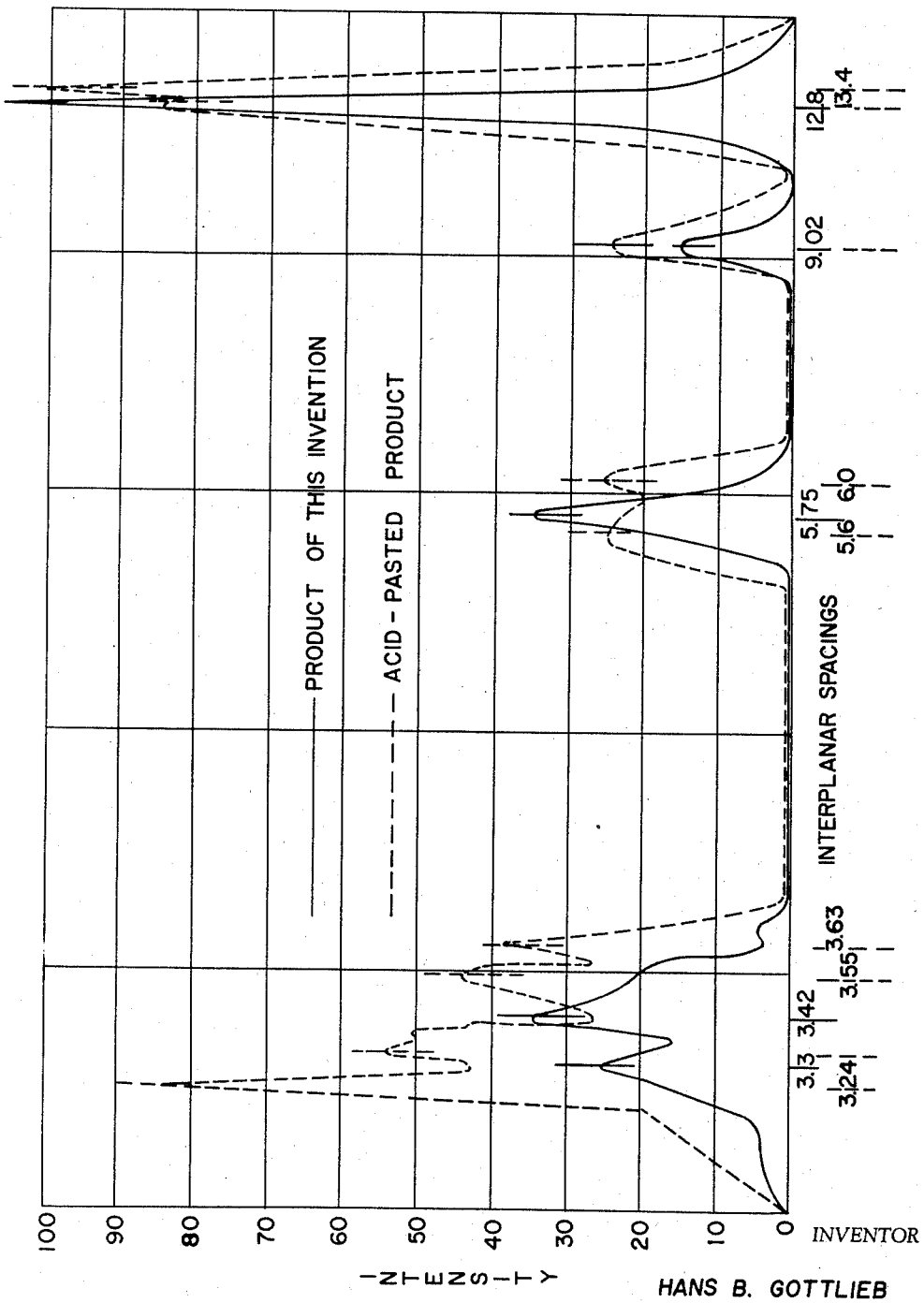

2,910,482

PHTHALOCYANINE COLORING MATTERS IN PIGMENTARY FORM

Hans B. Gottlieb, Glassboro, N.J., assignor to E. I. du Pont de Nemours and Company, Wilmington, Del., a corporation of Delaware Application February 8, 1955, Serial No. 486,888

8 Claims. (Cl. 260—314.5)

This application is a continuation-in-part of my copending application Serial No. 331,744, filed January 16, 1953, now abandoned.

This invention relates to novel phthalocyanine coloring matters in pigmentary physical state and to a process of making the same.

By "pigmentary state" is meant a state of fine subdivision which adapts the color for direct incorporation into litho-varnish or other similar vehicles, to produce printing inks or other coating compositions. By "direct incorporation" I do not mean to exclude the customary mechanical work of the pigment during incorporation into the vehicle, but I mean to exclude preliminary treatment of the pigment itself, such as acid-pasting, salt-milling or other similar operations designed to reduce the pigment particles to a fine physical state, without which its tinctorial strength is not developed fully by working in the ink mill.

The search for methods for producing phthalocyanine coloring matters in pigmentary state has been going on ever since this interesting series of colors has been developed. This search has been complicated by the fact that most pigments of the phthalocyanine series are polymorphic. In the case, for instance, of copper phthalocyanine (the chlorine-free product), the crudes obtained in most methods of its manufacture are in a crystalline form having a definite X-ray diffraction pattern and designated commonly as the beta-form. Furthermore, they are generally obtained in the form of relatively coarse, hard crystals, which are not readily subdivided on the ink mill. The crudes, accordingly, have very low and unsatisfactory tinctorial strength.

To obtain a pigment from such crudes, early practice developed the so-called "acid-pasting" method. In this procedure, the crude is dissolved in concentrated sulfuric acid and then reprecipitated by diluting the solution with water. Various modifications of and improvements on this basic process have subsequently been developed and patented. In all these acid-pasting processes, the reprecipitated color is obtained in the form of finely divided particles having a characteristic X-ray pattern different from the beta-form, and designated commonly as the alpha-form. Typical curves for intensity of diffracted X-radiation vs. angle of diffraction for both the alpha-form and the beta-form are given in Graham, U.S.P 2,556,728

The acid-pasting procedure, however, is only a partially satisfactory solution to the problem. Not only does it involve an extra operation upon the color (acid-pasting) which adds to its cost, but in the case of chlorine-free copper-phthalocyanine the alpha-form itself has the inherent fault of being relatively unstable when in contact with organic paint vehicles. When incorporated into paint and stored for a long time, the alpha-particles tend to go over slowly into the more stable beta-form, but in this process the beta-particles tend to grow into relatively large crystals, thus again lowering the tinctorial strength, and introducing furthermore problems of change of shade, non-uniform composition of the paint, etc.

Other recently developed methods for converting phthalocyanine colors into pigmentary state involve "salt-milling" (Lang and Detrick, U.S.P. 2,402,167), "salt-solvent-milling" (actually, salt milling in the presence of a very small quantity of an inert, aromatic liquid; Graham, aforecited), and certain special forms of ball milling in presence of a relatively large quantity of solvent (Lane, U.S.P. 2,556,726). But these methods again solve the problem of pigmentary form at the expense of an additional operation or series of operations, which add to the cost of the product.

It is accordingly an object of this invention to provide a process for producing phthalocyanine coloring matters in pigmentary form without unduly increasing the cost of the product. A special object of this invention is to provide novel phthalocyanine coloring matters which may be synthesized directly in pigmentary form and which will accordingly not require any extra mechanical, physical or chemical operations prior to incorporation into an ink vehicle. Still another object is to produce novel phthalocyanine coloring matters whose crystals are stable in hot aromatic solvents and which therefore will not suffer from instability in the presence of liquid paint vehicles, etc. Various other achievements and advantages of my invention will appear as the description proceeds.

My solution to the aforegoing problems, according to this invention, is based on the discovery that when monochloro, monobromo, dichloro and trichloro copper phthalocyanines are prepared from the special reagents and by the special procedure set forth hereinbelow these compounds are obtained directly in the pigmentary state.

The term "pigmentary state" refers to properties which are very largely functions of the size of the individual particles of the pigment. Although tinctorial strength is a practical measure of particle size, it requires reference to some arbitrary standard and can have no absolute value. On the other hand, the "specific surface" which is a measure of the total surface area of all the particles in a given weight of the pigment is an absolute measure independent of any other product and has been demonstrated to be closely related to the tinctorial strength. Emmett's nitrogen adsorption method (Advances in Colloid Science, volume 1, pages 1–36; Interscience Publishers Inc., 1942) is an accepted means of measuring the surface area of fine powders. Application of this method to phthalocyanine pigments has shown that those products which are considered pigmentary from a practical point of view have surface areas of at least 60 square meters per gram. Typical products of this invention have been examined by this method and have shown surface areas of at least 75 square meters per gram up to as much as 90 square meters per gram or even greater.

More particularly, the novel group of compounds embraced by my invention are halogenated copper phthalocyanines which analyze not less than 5.5% and not more than 17% halogen by weight, and whole halogens are elements of the group consisting of chlorine and bromine and are located in the benzene nuclei of the phthalocyanine complex and, at that, in particular positions, namely the positions meta to the nearest CN grouping. This detail about position will become clearer when it is considered that according to my preferred mode of synthesis, the novel compounds are prepared by the so-called "urea-process" of phthalocyanine synthesis, from initial materials comprising a mixture of halogen-free phthalic anhydride (or its equivalent) and 4-chloro- or 4-bromo-phthalic anhydride (or their equivalents).

Confining our attention, henceforth, for the sake of simplicity, to the chlorine species of this invention, the choice of initial materials and the general course of the reaction may be indicated by the following typical equation:

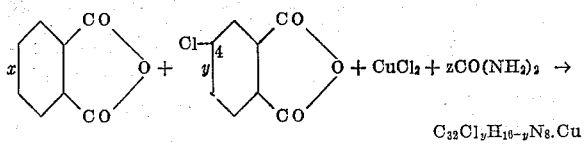

$$C_{32}Cl_yH_{16-y}N_8 \cdot Cu$$

In this equation the ratio $y/x$ is not substantially less than ⅓ and not substantially greater than 3. By "substantially" is meant that the specified ratios may vary by a few percent either way, say from a lower limit of 0.31 to a higher limit of 3.2. The sum $(x+y)$ is essentially theory, that is 4 moles per mole of $CuCl_2$; but variations up to 10% either way are permissible. The quantity of urea employed in this invention is much larger than customary hitherto in the conventional urea process, and is generally from 15 to 40 moles of urea per mole of $CuCl_2$. Accordingly, $z$ in the above equation has a value of 15 or more. The Cl-atom in the initial phthalic anhydride material is located in the 4-position, which is meta to the nearest CO group. Therefore, in the product, the halogens will likewise be located in the arylene rings of the phthalocyanine molecule, and in a position meta to the nearest CN group.

The pigments thus obtained exhibit a number of novel and unexpected characteristics which demonstrate that they are in a new physical form, not heretofore known in the art. For instance, in the case of monochloro copper phthalocyanine obtainable according to this invention, the following physical characteristics are observable:

(1) *Particle size.*—The product requires no further particle size reduction to make it suitable for ordinary pigment uses. Examination in the electron microscope shows that the powder is made up of loose agglomerates (0.5 to 3 microns long) of extremely thin primary crystals of the following approximate dimensions:

Length—0.03 to 0.50 micron
Width—0.02 to 0.25 micron
Thickness—0.01 to 0.04 micron When the specific surface is measured by the well-known nitrogen adsorption method of Emmett et al., the powder shows a specific surface of about 80 square meters per gram.

(2) *Color.*—Whereas it is generally recognized that the prior art monochloro copper phthalocyanine obtained in pigmentary particle size by acid pasting or salt milling is somewhat greener and duller in hue than similar products finished in like manner but containing less chlorine, it is found that the monochloro-product of this invention is redder and more intense than such prior art products of equal or less chlorine content.

(3) *Crystal phase.*—It has long been recognized that copper phthalocyanine substantially free of chlorine may exist in two crystal phases (see Lane U.S. 2,556,726 or Wiswall U.S. 2,486,351). The one, commonly obtained by acid pasting or salt milling, is relatively red in hue and frequently called the alpha phase. The second, commonly obtained after exposure of such products to various crystallizing solvents, particularly under the conditions set forth in the above patents, is relatively green in hue and frequently called the beta phase. These two phases have been clearly characterized by their X-ray diffraction patterns. It has been generally believed, however, that copper phthalocyanine containing more than about 3.5% chlorine exists in only one crystal phase substantially identical in its X-ray diffraction pattern to that of the alpha phase of the chlorine-free species.

It is now found, however, that the monochloro product of this invention exists in a new crystal phase not heretofore known (and which is now designated for purposes of identification as the gamma phase). The X-ray diffraction pattern is superficially similar to that of the prior art alpha phase but careful examination discloses characteristic differences which are set forth in Tables I and II hereinbelow, wherein the X-ray diffraction bands of typical samples are characterized by their interplanar spacings in Angstrom units (A.) and the intensities of these bands are given numerical values relative to the most intense band at 100. (The Bragg angles using copper K-alpha radiation are also shown.)

(4) *Solvent stability.*—It has long been recognized that alpha phase chlorine-free copper phthalocyanine is sensitive to the action of certain crystallizing solvents showing in general, a marked increase in crystal size and a change in phase on exposure to such solvents accompanied by marked changes in hue and loss in color strength. On the other hand, it has been believed that the presence of chlorine tends to stabilize the product and that monochloro copper phthalocyanine is completely stable to the action of such solvents.

It is now found, however, that the relative behaviors of the new gamma phase product and the prior-art, alpha-phase, monochloro copper phthalocyanine, when the powders are exposed to hot aromatic solvents such as boiling xylene or boiling orthodichlorobenzene, may be used to further characterize the products. It is true that neither product shows any significant change in either color or tinctorial strength on such exposure to hot solvents. However, the rather diffuse X-ray diffraction pattern of the prior-art alpha-phase products is changed to a sharper pattern indicative of higher crystallinity, and two of the bands commonly associated with the alpha phase tend to become resolved into doublets or closely associated bands. On the other hand, the new gamma phase product of this invention shows no change beyond some slight variation in the relative intensities of the bands. Table III summarizes the X-ray diffraction pattern of a highly crystalline alpha phase after exposure to the hot solvent.

The accompanying drawing is a conventional representation of the X-ray diffraction patterns of typical samples of the alpha and gamma phases of monochloro copper phthalocyanine after exposure to boiling orthodichlorobenzene. The relative intensity of diffracted energy is plotted on the vertical axis against the interplanar spacing in Angstrom units on the horizontal axis, all the patterns having been adjusted so that the intensity of the strongest band is equal to 100 in each case. The dotted curve represents the prior-art acid-pasted product (the alpha form) while the continuous curve belongs to the novel monochloro product of this invention.

Inspection of these curves shows that there are five prominent peaks characteristic of the new gamma phase, corresponding to interplanar spacings of 12.8 A., 9.02 A., 5.75 A., 3.42 A. and 3.30 A. This pattern is further characterized by:

(1) The sharpness of the peaks with interplanar spacings near 12.8 A. and 5.75 A.

(2) The two prominent peaks with interplanar spacings near 3.42 A. and 3.30 A. of which the first is always the more intense.

TABLE I

*Gamma monochloro copper phthalocyanine*

| Bragg Angle | Characteristic Interplanar Spacing, A. | Typical Relative Intensity |
|---|---|---|
| 6.9 | 12.8 | 100 |
| 9.8 | 9.02 | 15 |
| 15.4 | 5.75 | 34 |
| 26 | 3.42 | 34 |
| 27 | 3.30 | 26 |

TABLE II

*Acid pasted monochloro copper phthalocyanine alpha-phase—poorly crystalline*

| Bragg Angle | Characteristic Interplanar Spacing, A. | Typical Relative Intensity |
| --- | --- | --- |
| 6.7 | 13.2 | 100 |
| 9.5 | 9.30 | 21 |
| 14.8 | 5.98 | 24 |
| 15.5 | 5.71 | 23 |
| 24.5 | 3.63 | 32.5 |
| 25.4 | 3.50 | 41 |
| 26.8 | 3.32 | 61 |
| 27.4 | 3.25 | 74.5 |

TABLE III

*Highly crystalline alpha phase monochloro copper phthalocyanine after hot solvent treatment*

| Bragg Angle | Characteristic Interplanar Spacing, A. | Typical Relative Intensity |
| --- | --- | --- |
| 6.6 | 13.4 | 100 |
| 6.9 | 12.8 | 85 |
| 9.8 | 9.02 | 24 |
| 14.8 | 5.98 | 25 |
| 15.8 | 5.60 | 23 |
| 24.5 | 3.63 | 37 |
| 25.1 | 3.55 | 43.5 |
| 26.8 | 3.32 | 53 |
| 27.5 | 3.24 | 85 |

The other low-halogen copper phthalocyanines of this invention (1 to 3 halogen atoms per molecule) are likewise characterized by typical X-ray patterns, which can be recognized by having five prominent peaks at the following interplanar spacings:

(a) 12.8–13.4 A.
(b) 9.02–9.30 A.
(c) 5.75–6.02 A.
(d) 3.39–3.45 A.
(e) 3.26–3.32 A.

the first and third of these peaks being relatively sharp, and the fourth being always more intense than the fifth.

My discovery above mentioned is amazing when it is considered that chlorine-free copper-phthalocyanine, mono-(3)-chloro copper phthalocyanine (produced, say, by the urea-process above from a 3:1 mixture of phthalic anhydride and 3-chloro-phthalic anhydride) and tetra-(4)-chloro copper phthalocyanine (obtained, say, by the urea-process above, but using 4-chloro-phthalic anhydride exclusively) do not yield a pigmentary product when produced by the urea method, even when the later is modified according to this invention, but require after-treatment, as for instance acid-pasting or salt-solvent milling, to give them tinctorial value.

In this specification and in the claims below the expression "urea process" of phthalocyanine synthesis shall be understood as referring to the process which comprises heating, at phthalocyanine-forming temperature, a reaction mixture containing an organic phthalocyanine intermediate, a urea-type nitrogen donor, a metal donor reagent and an ancillary agent (also called promoter or "catalyst") for this type of reaction.

The organic phthalocyanine-intermediate above mentioned may be a compound typified by ortho-phthalic acid or a nuclear halogen derivative thereof, or the corresponding anhydrides, acid halides, lower alkyl esters, ammonium salts, monoamides, diamides, imides and iminoimides.

By "urea-type nitrogen donor" is meant a compound having the atomic sequence

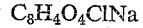

in its structure and adapted to split off urea or ammonia upon heating. Convenient illustrations are urea, biuret, guanidine, guanyl urea, dicyandiamide, and cyanuric acid.

The metal donor reagent for the purpose of this invention is a copper yielding agent, and may be cupric chloride, cupric sulfate or cupric nitrate, anhydrous or hydrated.

The promoter, ancillary agent or catalyst may be ammonium molybdate, ammonium borotungstate, ammonium phospho-molybdate, ammonium vanadate, phosphotungsto-molybdic acid, or in general any salt of an inorganic acid or oxide containing an element from groups V and VI of the periodic system.

Further details on the urea-type synthesis of copper phthalocyanine may be found in Wyler, U.S.P. 2,197,458; Riley, U.S.P. 2,214,477; O'Neal, U.S.P. 2,410,301; Moser, U.S.P. 2,549,842; Brouillard, U.S.P. 2,647,128 and 2,673,854. The general urea process of these references, however, is modified in several respects for the purpose of this invention.

In the first place, I use a much larger proportion of urea, as already indicated above.

Secondly, while the prior art has often carried out the urea process in the absence of any solvent or diluent, my novel process is characterized by adding to the reaction mass an inert, organic liquid in sufficient quantity to enable rapid stirring of the mass. As convenient organic liquids for this purpose may be mentioned nitrobenzene, o-nitrotoluene, trichlorobenzene, o-dichlorobenzene, and kerosene.

Thirdly, I prefer to use relatively low reaction temperatures. Thus, whereas the reaction temperature in the established urea process of the prior art has been varied from 150° to 260° C., with a more common range of 180° to 220° C. I prefer to carry out the synthesis of this invention at a temperature not exceeding 190° C.

The use of an "ancillary agent" or catalyst in the urea-process is per se a well-known improvement upon the latter (Riley, U.S.P. 2,214,477) and is followed by me also in this invention. Ammonium molybdate is the catalyst preferred by me for this purpose.

The recovery of my novel reaction products from their reaction mass may follow standard procedure, which includes removal of the "solvent" (inert organic liquid) by steam distillation or alcohol extraction, successive treatment of the mass with dilute alkali and dilute acid, filtrations, washings and drying. The crude product may contain agglomerates of the ultimate pigmentary particles, but they are not hard crystals and are easily dispersed in conventional coating composition vehicles to give compositions of high tinctorial strength, substantially free from grit.

Without limiting my invention, the following examples are given to illustrate my preferred mode of operation. Parts mentioned are by weight.

EXAMPLE 1

An aqueous filter cake containing 10 parts of 4-chlorophthalic acid monosodium salt, calculated as $C_8H_4O_4ClNa$ is mixed with 121 parts of nitrobenzene and 6.1 parts of concentrated (37%) hydrochloric acid or an equivalent amount of concentrated sulfuric acid. Water is expelled by heating this mixture with agitation to 150° C. As the mixture becomes free of water, the chlorophthalic acid goes into solution.

After cooling to 110° C., 16.3 parts of phthalic anhydride, 61 parts of powdered urea, 5.6 parts of micropulverized, anhydrous cupric chloride and 0.07 part of ammonium molybdate are added. The reaction mass is heated with good agitation and slowly (over the course of 4–5 hours) to 175° C., and is agitated at 175° C. to 180° C. for an additional 4–5 hours. After cooling to 100° C., the reaction mass is drowned into a steam still containing a solution of 17 parts of sodium carbonate in 50 parts of water. After all the nitrobenzene has distilled off, the pigment is filtered off and washed with water until free of alkali. The resulting filter cake is introduced into 410 parts of 22% sulfuric acid and the slurry is agitated for 4–5 hours at 85° C. to 90° C. The pigment is then filtered off, washed acid-free, dried at 60° C. under constant humidity and screened through a 60-mesh sieve.

Pigments prepared by me according to the above procedure had a chlorine content of 5.8% to 7.0%. When tested in lithographic ink drawdowns against a bright, acid-pasted, commercial copperphthalocyanine powder containing about 3% chlorine, they were found to be of superior texture and of equal strength. By "superior texture" is meant that the new color developed its optimum tinctorial strength by less mechanical working on the ink mill than the standard. The acid-extracted filter cake of this example likewise exhibited excellent quality when tested against commercial filter cakes of comparable shade.

The pigment powders prepared as above consist of loose agglomerates (0.5 to 3 microns long) of extremely thin primary crystals which, according to shadow-cast electron-photo-micrographs of the dispersed litho-varnish masstone inks, are of the following dimensions:

Length—0.03 to 0.50μ
Width—0.02 to 0.25μ
Thickness—0.01 to 0.04μ

The X-ray diffraction pattern of these pigment powders is different from either the alpha or the beta form referred to in the Graham patent above cited, and is characterized particularly by prominent peaks at the following Bragg angles or interplanar spacings (using a copper target):

| Bragg Angle (2θ), degrees | Interplanar Spacing, A. | Intensity relative to the highest peak (by rough estimate) |
|---|---|---|
| 6.9 | 12.8 | 1 1.00 |
| 9.8 | 9.02 | 0.2 |
| 15.4 | 5.75 | 0.4 |
| 26 | 3.42 | 0.2 |
| 27 | 3.30 | 0.15 |

1 (Peak of reference.)

The pigments prepared by the above process are solvent-stable; that is, they do not undergo transition to a different phase when subjected to organic solvents. When treated with boiling xylene over periods of one or several hours they do not lose tinctorial strength and do not change their X-ray diffraction pattern.

In lieu of nitrobenzene in the above example, o-nitrotoluene, trichlorobenzene or o-dichlorobenzene (pure or technical grades) may be used with essentially the same results.

EXAMPLE 2

An aqueous filter cake containing 10 parts of monosodium-4-chlorophthalate, calculated as $C_8H_4O_4ClNa$, is charged into a reaction vessel together with 97 parts of technical ortho-dichlorobenzene, 3.1 parts of 37% aqueous hydrochloric acid, 17 parts of phthalic anhydride, 32.4 parts of powdered urea, 5 parts of micropulverized, anhydrous cupric chloride and 0.043 part of ammonium molybdate. The mass is gradually heated with good agitation to 170° C. over the course of 2.5 hours. At this point, the mass is seeded with pigment crystals obtained from a previous run, heated at 175° C. to 178° C. with vigorous agitation for another 2.5 hours, and finally cooled to 120° C. The pigment is filtered off on a steam-heated filter. The filter cake is re-slurried with good agitation in 180 parts of technical ortho-dichlorobenzene at 80° C. to 90° C. for 1 hour. After another filtration on a steam-heated filter, the pigment is extracted twice at 70° C. and for 0.5 hour, with 170 parts of denatured ethyl alcohol in each extraction. The resulting filter cake is introduced into 220 parts of 0.8% aqueous sodium hydroxide and is extracted in that medium at 70° C. for 0.5 hour, whereupon the pigment is again filtered and washed with water until free of alkali. The pigment is finally acid-extracted by slurrying in 220 parts of 1% hydrochloric acid at 70° C. for 1.5 hours. After filtration, the product is washed acid-free, dried at 60° C. under constant humidity and screened through a 60-mesh sieve.

A sample prepared by me according to the above procedure analyzed 5.8% Cl. When this product was tested in lithographic varnish versus the standard used in Example 1, it was found to be of equal strength, except that the masstone was slightly milky compared to the very jet masstone of the standard. Its shade in ink drawdowns is appreciably redder than that of monochloro copper phthalocyanine obtained by fusing together phthalonitrile and cupric chloride according to Linstead et al., U.S.P. 2,129,013.

The X-ray pattern of the pigment of this example was essentially the same as that of the product obtained in Example 1. This diffraction pattern did not change when the pigment wase treated for 1 hour with boiling xylene.

Pigments prepared according to this example have also been subjected to measurement of their surface area by Emmett's nitrogen adsorption method, and were found to give values of 90 square meters per gm. and better.

EXAMPLE 3

A mixture of 10 parts of 4-chlorophthalimide, 21 parts of phthalic anhydride, 7 parts of micropulverized, anhydrous cupric chloride, 74 parts of urea and 0.06 part of ammonium molybdate in 150 parts of nitrobenzene is heated with good agitation to 170° C. over the course of 4–5 hours and then rapidly stirred at 170° C. to 175° C. for an additional 3 hours. After cooling to 90° C., the slurry is filtered on a steam-heated filter, and the filter cake is re-slurried and extracted twice at 70° C. for 1 hour, each time with 180 parts of nitrobenzene, and followed each time by a hot filtration on a steam heated filter. The pigment is then further treated as in Example 2, including the successive extractions with ethyl alcohol, dilute sodium hydroxide and dilute HCl, and final washing, drying and screening. The resulting pigment powder gives lithographic varnish rub-outs, which compare well with those of an acid-pasted standard. Its chlorine content is 7.7%.

Similar results are obtained if the 4-chlorophthalimide in the above example is replaced by an equivalent amount of 4-chlorophthalic anhydride.

EXAMPLE 4

An aqueous filter cake, containing ten parts of monosodium 4-chlorophthalate, calculated as $C_8H_4O_4ClNa$, is mixed with 68 parts of nitrobenzene and 6 parts of concentrated hydrochloric acid. The mixture is heated to 150° C. with agitation to expel water and excess hydrogen chloride. The 4-chlorophthalic acid goes into solution. After cooling to 110° C., 6.7 parts of phthalic anhydride, 34 parts of urea, 3.1 parts of micropulverized, anhydrous cupric chloride and 0.036 part of ammonium molybdate are added. The reaction mass is then heated as in Example 1 and worked up as in that example. The resulting pigment has a chlorine content of 11.5%, which corresponds to a product consisting predominantly of dichloro copper phthalocyanine. The product does not undergo loss of tinctorial strength when heated in boiling xylene for 1 hour. Before and after the xylene test, it displays the same X-ray diffraction pattern, which is very similar to that of the product obtained in Example 1. More particularly, the X-ray pattern displays five prominent peaks at the interplanar spacings of 13.0, 9.2, 5.8, 3.41 and 3.29 A. Its tinctorial strength as revealed by lithographic ink drawdowns is essentially the same as that of the standard mentioned in Example 1, but its shade is slightly greener.

EXAMPLE 5

An aqueous filter cake, containing ten parts of monosodium 4-chlorophthalate, calculated as $C_8H_4O_4ClNa$ on the basic of organic chlorine analysis, is mixed with 45 parts of nitrobenzene and 5.8 parts of concentrated hydrochloric acid. The mixture is heated to 150° C. to expel water and excess hydrogen chloride. After cooling to 110° C., 2.2 parts of phthalic anhydride, 23 parts of urea, 2.1 parts of micropulverized, anhydrous cupric chloride and 0.024 part of ammonium molybdate are added. The reaction and recovery are then conducted as in Example 1. The resulting pigment analyzes 16.6% Cl, and is accordingly, essentially tri-(4)-chloro-copper phthalocyanine. Like the products of the preceding examples, it is resistant to crystal growth in hot aromatic solvents, and shows essentially the same X-ray diffraction pattern as the product obtained in Example 1, except that the locations of the five characteristic peaks are at the interplanar spacings of 13.4, 9.3, 6.0, 3.41 and 3.29 A. Its strength is essentially equal to that of pigmentary beta copper phthalocyanine (U.S.P. 2,556,726) but it is slightly greener in shade.

EXAMPLE 6

In this example the materials and process were the same as those in Example 2 with the exception that 90 parts of nitrobenzene were used instead of ortho-dichlorobenzene and a larger amount of urea (70 parts) was employed. A pigmentary mono-(4)-chloro-copper phthalocyanine of high quality was obtained in excellent yield. It will be noted that the quantity of urea employed here amounted to about 32 moles per mole of $CuCl_2$.

It will be understood that the details of the above examples may be varied widely without departing from the spirit of this invention. Thus, in lieu of phthalic acid, phthalic anhydride, phthalimide and their 4-chloro derivatives in the above examples, one may use respectively the unchlorinated and 4-chloro derivatives of phthalamide, or mono- and di-ammonium phthalate. Furthermore, the unchlorinated and 4-chloro derivatives selected for making up the initial phthalic mixture according to this invention need not be matched up; for instance, 4-chlorophthalimide may be mixed with chlorine-free phthalic anhydride, and vice versa.

The quantity of urea employed may vary within wide limits, but the preferred proportions are 16 to 32 moles of urea per mole of cupric chloride. Quantities less than 15 moles may affect the yield. Larger quantities, say over 40 moles, would simply be wasteful. The proportion of urea employed may have an effect on the yield of pigment obtained, but within the limits specified, the variations will generally not exceed 20% either way.

In lieu of the solvents mentioned, any other inert organic liquid which is liquid at the selected reaction temperature (175° to 190° C.) may be employed. The liquid should also preferably be a good solvent for the phthalic agents employed, at least at temperatures above 120° C. It need not be a solvent for urea.

The quantity of solvent to be employed should be sufficient to provide an easily stirrable mass, having in mind vigorous agitation. For the same reason, it is recommended that the cupric chloride be in a finely divided state, as achieved by micropulverization. The degree of subdivision implied by this is that the product should at least pass completely through a 60-mesh sieve.

It is essential that the reaction mass be vigorously stirred during the reaction so as to produce and maintain uniform distribution of the reactants in the liquid reaction medium, whereby to minimize the chances of formation of chlorine-free copper phthalocyanine. A practical illustration of how this goal may be achieved in plant operation is given by the following additional example.

EXAMPLE 7

An enamel-lined, jacketed kettle of 1000 gallons capacity, fitted with an impeller agitator and baffles on the kettle wall, is charged with 5670 lbs. of nitrobenzene, 429 lbs. of 96% sulfuric acid and an aqueous press-cake of monosodium-(4)-chlorophthalate containing 468 lbs. of $C_8H_4ClO_4Na$. This mixture is heated with agitation to 150° C. to distill out the water.

After cooling to 110° C., one charges 800 lbs. of phthalic anhydride, 2475 lbs. of urea, 272 lbs. of freshly micropulverized anhydrous cupric chloride and 4.0 lbs. of ammonium molybdate. The mass is then agitated at 110 to 120 r.p.m. and the temperature is gradually raised to 175° C. over the course of 4.5 hours. Agitation at 80 to 90 r.p.m. is continued for another 4 hours at 175° to 180° C.

After cooling to 110° C., the synthesis mass is drowned into a 3000 gal. steam still, fitted with efficient agitator (e.g., 50 to 60 r.p.m.) and containing a solution of 750 lbs. of soda ash in 3000 lbs. of water. The nitrobenzene is distilled off with steam. After its removal one adds 750 lbs. of 30% aqueous caustic soda and steams for an additional 0.5 hour. The filtered pigment is washed free from alkali and is then introduced into a solution of 4300 lbs. of 98% sulfuric acid in 15,000 lbs. of water. The pigment is slurried in this medium for 4 hours at 90° C. Impurities are hydrolyzed and made soluble in this slurry. The color is filtered at 60° C., washed free of acid, dried at 60° C. in a constant-humidity drying oven and screened through a 60-mesh sieve. The pigment thus obtained compares well in strength and intensity of the lithographic rub-outs with those of commercial, acid-pasted, blue copper phthalocyanine pigments now on the market.

Various other permissible variations will be readily apparent to those skilled in this art. For instance, urea may be partly or completely replaced by biuret. In lieu of 4-chlorophthalic acid monosodium salts or its equivalent intermediates, the corresponding 4-bromo compounds may be employed. Provided there is enough of the mono-(4)-halogen intermediate to yield a pigment having not less than 1 and not more than three halogen atoms per molecule, phthalic intermediates having other substituents in the 4-position, for instance 4-sulfo-phthalic acid, may be admixed with the reactants in minor proportions, say not over 8% by weight of total phthalics, to produce special effects. In lieu of cupric chloride, copper sulfate, copper nitrate or other available copper donors, whether anhydrous or hydrated, may be employed. These variations are illustrated by the following additional examples.

EXAMPLE 8

Ten parts of 4-bromophthalic acid are charged into a reaction vessel together with 110 parts of nitrobenzene, 55.1 parts of urea, 15.6 parts of phthalic anhydride, 5.1 parts of anhydrous micropulverized cupric chloride and 0.058 part of ammonium molybdate. The mass is heated with good agitation to 170° C. over the course of 4.5 hours, and then heated with vigorous agitation at 175° to 180° C. for another 4 hours. The temperature is then allowed to drop to 130° C. and the mass is filtered and washed with 40 parts by weight of hot (100° C.) nitrobenzene. The pigment is successively extracted with 100 parts of hot (100° C.) nitrobenzene for 0.5 hour, 80 parts of hot (70° C.) ethyl alcohol for 1 hour, washed on the filter with ethyl alcohol until free from nitrobenzene, then extracted with 120 parts of hot (90° C.) 8% solution of sodium hydroxide for 2 hours and finally with 120 parts of hot (70° C.) 2% hydrochloric acid for 1.5 hours. The color is washed acid-free, dried at 60° C. and screened through a 60 mesh sieve. There is obtained mono-4-bromo-copper phthalocyanine which contains 12.8% bromine. Theory for $C_{32}H_{15}BrN_8Cu$ is 12.2% Br. Lithographic ink drawdowns of this new pigment and those of a commercial acid-pasted semichloro copper phthalocyanine display equal strength and similar shade. The X-ray diffraction pattern of this product contains prominent peaks at the following interplanar spacings: 13.1, 9.2, 5.83, 3.45 and 3.32 A.

EXAMPLE 9

An aqueous filter cake containing 10 parts of monosodium-4-chlorophthalate, calculated as $C_8H_4O_4ClNa$, is charged into a reaction vessel together with 121 parts of nitrobenzene and 11.5 parts of 98% sulfuric acid. The mixture is heated with agitation to 150° C. to expel water and is held at that temperature for 1 hour. The mass is then allowed to cool to 100° C., when there are further charged 19.2 parts of urea, 38.8 parts of biuret, 17.1 parts of phthalic anhydride, 5.6 parts of anhydrous micropulverized cupric chloride and 0.064 part of ammonium molybdate. The mass is gradually heated with good agitation to 175° C. over the course of 4.5 hours and then heated with vigorous agitation at 175° to 180° C. for another 4 hours. Following this synthesis the color is isolated by solvent extraction as described in Example 8. Mono-4-chloro copper phthalocyanine of 6.4% Cl content is obtained. After screening through a 60-mesh screen, the pigment is ready for use in the trade, and needs no further finishing. It gives lithographic tints which are stronger and very similar in shade, when compared with a commercial acid-pasted semi-chloro copper phthalocyanine.

EXAMPLE 10

The synthesis in this example and the isolation steps are the same as in Example 9, except that 49.6 parts of biuret are charged instead of a mixture of biuret with urea. The resulting color has good pigmentary strength.

EXAMPLE 11

An aqueous press-cake containing 10 parts of monosodium-4-chlorophthalate, calculated as $C_8H_4O_4ClNa$, is charged together with 121 parts of technical nitrobenzene and 11 parts of 98% sulfuric acid. The mixture is heated to 150° C. to expel all water from the press-cake and to form free 4-chlorophthalic acid.

After cooling to 110° C. one charges 17 parts of phthalic anhydride, 53 parts of powdered urea, 10 parts of well-ground cupric nitrate trihydrate $Cu(NO_3)_2.3H_2O$, and 0.064 part of ammonium molybdate. This charge is heated to 120° C. with good agitation, then over the course of 4 hours to 175° C. and is then well-stirred at 175° to 180° C. for another 4 hours. At the conclusion of the synthesis one adds 30 parts of nitrobenzene to thin out the reaction mass. The latter is drowned at 100° C. into a solution of 30 parts of sodium carbonate in 300 parts of water. The resulting slurry is refluxed with agitation for 8 hours. The nitrobenzene is then distilled off, with repeated decantation of the aqueous layer (compare U.S.P. 2,668,171). When all nitrobenzene has been removed by the steam, one adds sufficient sodium hydroxide to raise the pH to 13 and refluxes with good agitation for 5 hours. After filtration, the pigment is washed alkali-free, slurried in 280 parts 25% sulfuric acid at 95° to 100° C. for 4 hours, again filtered, washed acid-free and finally washed with 150 parts of 10% aqueous ammonia on the filter. The color is washed free from ammonia and dried at 60° C. in a constant-humidity oven.

The resulting pigment is similar in quality to that described in Example 1.

EXAMPLE 12

A well-agitated reactor equipped with a reflux condenser and arranged for external heating is charged with 800 parts of ortho-dichlorobenzene and with a semi-dry cake of 4-chlorophthalic acid equivalent of 56.2 parts of 100% 4-chlorophthalic acid. The charge is heated to about 150° C. and held near that temperature for about ½ hour to remove all water from the mixture. After cooling to about 110° C., the following ingredients are added to the reactor:

106.6 parts of phthalic anhydride
35 parts of anhydrous cupric chloride
330 parts of urea
0.4 part of ammonium molybdate The charge is then heated to 150 to 155° C. in about 1 hour and held at that temperature for about 3 hours. It is then heated to about 175° C. in about 1 hour and held at 175° to 180° C. for about 4 hours.

The hot charge is then run into about 2000 parts of cold water and the ortho-dichlorobenzene removed by steam distillation. When the charge is free of solvent, it is filtered, washed several times with hot water and re-slurried in strong sulfuric acid to give about 20% $H_2SO_4$ in the total liquid. This mixture is heated to about 95° C. and stirred at this temperature for about 4 hours followed by filtration, washing free of acid and sulfate ions and finally drying and pulverizing to give 132 parts of blue monochloro copper phthalocyanine pigment.

EXAMPLE 13

The same reactor as described in Example 12 was charged with:

800 parts of ortho-dichlorobenzene
56.2 parts (100% basis) of a water-wet paste of 4-chlorophthalic acid
9.2 parts (100% basis) of a water-wet paste of 4-sulfophthalic acid.

This charge was heated to 150° C. for dehydration as in Example 12, cooled to about 110° C. and the following ingredients were added:

101 parts of phthalic anhydride
35 parts of anhydrous cupric chloride
330 parts of urea
0.4 part of ammonium molybdate The charge was then subjected to the same heating cycle as described in Example 12, followed by removal (by steam distillation) of the ortho-dichlorobenzene, extraction, filtration and drying as set forth therein.

The product exhibits the same particle size, gamma crystal phase and solvent stability as described above. In color it is slightly greener than the product containing no sulfo groups, but is substantially free from any tendency to flocculate in coating compositions.

The general subject of phthalocyanine synthesis by the urea process in the presence of 4-sulfophthalic acid for the purpose of endowing the product with flocculation resistance is described more fully and claimed in copending application of F. F. Ehrich, Serial No. 391,729, filed November 12, 1953.

I claim as my invention:

1. As a new coloring composition, copper phthalocyanine containing in at least one of its benzene nuclei, in positions meta to the nearest CN group, halogen selected from the group consisting of chlorine and bromine, the analysis of said composition as to halogen being not less than 5.5% and not more than 17% by weight and there being not more than one halogen atom in any benzene ring, said composition being in a pigmentary state and being characterized by tinctorial-strength stability when placed in organic solvents, as determined by boiling for 1 hour in xylene, said pigmentary state being sufficiently fine to give the composition a specific surface of at least 60 square meters per gram as determined by the nitrogen adsorption method, and said composition being further characterized by an X-ray diffraction pattern having five prominent peaks at the following interplanar spacings:

(a) 12.8–13.4 A.
(b) 9.02–9.3 A.
(c) 5.75–6.02 A.

(d) 3.39–3.45 A.
(e) 3.26–3.32 A.

the first and third of these peaks being relatively sharp, and the fourth peak being more intense than the fifth.

2. As a new coloring composition, a monochloro copper phthalocyanine wherein the chlorine is located in one of the benzene nuclei of the phthalocyanine molecule in position meta to the nearest CN group, said composition being in a pigmentary state and being characterized by tinctorial-strength stability when placed in organic solvents, as determined by boiling for 1 hour in xylene, said pigmentary state being sufficiently fine to give the composition a specific surface of at least 75 square meters per gram as determined by the nitrogen adsorption method, and said composition being further characterized by an X-ray diffraction pattern having five prominent peaks at the following interplanar spacings:

(a) 12.8 A.
(b) 9.02 A.
(c) 5.75 A.
(d) 3.42 A.
(e) 3.30 A.

the first and third of these peaks being sharp, and the intensity of the fourth peak being greater than that of the fifth.

3. As a new coloring composition, a dichloro copper phthalocyanine wherein the chlorine is located in the benzene nuclei of the phthalocyanine molecule in position meta to the nearest CN group but no benzene ring having more than one chlorine atom, said composition being in a pigmentary state and being characterized by tinctorial-strength stability when placed in organic solvents, as determined by boiling for 1 hour in xylene, said pigmentary state being sufficiently fine to give the composition a specific surface of at least 75 square meters per gram as determined by the nitrogen adsorption method, and said composition being further characterized by an X-ray diffraction pattern having five prominent peaks at the following interplanar spacings:

(a) 13.0 A.
(b) 9.2 A.
(c) 5.8 A.
(d) 3.41 A.
(e) 3.29 A.

the first and third of these peaks being sharp, and the intensity of the fourth peak being greater than that of the fifth.

4. As a new coloring composition, a trichloro copper phthalocyanine wherein the chlorine is located in the benzene nuclei of the phthalocyanine molecule in position meta to the nearest CN group but no benzene ring having more than one chlorine atom, said composition being in a pigmentary state and being characterized by tinctorial-strength stability when placed in organic solvents, as determined by boiling for 1 hour in xylene, said pigmentary state being sufficiently fine to give the composition a specific surface of at least 75 square meters per gram as determined by the nitrogen adsorption method, and said composition being further characterized by an X-ray diffraction pattern having five prominent peaks at the following interplanar spacings:

(a) 13.4 A.
(b) 9.3 A.
(c) 6.0 A.
(d) 3.41 A.
(e) 3.29 A.

the first and third of these peaks being sharp, and the intensity of the fourth peak being greater than that of the fifth.

5. As a new coloring composition, a monobromo copper phthalocyanine wherein the bromine is located in one of the benzene nuclei of the phthalocyanine molecule in position meta to the nearest CN group, said composition being in a pigmentary state and being characterized by tinctorial-strength stability when placed in organic solvents, as determined by boiling for 1 hour in xylene, said pigmentary state being sufficiently fine to give the composition a specific surface of at least 75 square meters per gram as determined by the nitrogen adsorption method, and said composition being further characterized by an X-ray diffraction pattern having five prominent peaks at the following interplanar spacings:

(a) 13.1 A.
(b) 9.2 A.
(c) 5.83 A.
(d) 3.45 A.
(e) 3.32 A.

the first and third of these peaks being sharp, and the intensity of the fourth peak being greater than that of the fifth.

6. The process of producing a phthalocyanine coloring matter of blue shade and in a state suitable directly for incorporation into litho-varnish to form a printing ink, which comprises reacting micropulverized, anhydrous cupric chloride with urea and a mixture of a phthalic and a monochlorophthalic compound, said phthalic compound being selected from the group consisting of phthalic acid, mono and diammonium phthalate, phthalic anhydride, phthalamide and phthalimide, and said monochlorophthalic compound being selected from the group consisting of 4-chlorophthalic acid, mono and diammonium 4-chlorophthalate, 4-chlorophthalic anhydride, 4-chlorophthalamide and 4-chlorophthalimide, said mixture comprising not substantially less than ⅓ mole and not substantially more than 3 moles of said monochlorophthalic compound for each mole of phthalic compound, and about 4 moles of the mixture of the two for each mole of cupric chloride, the reaction being effected at a temperature not exceeding 190° C., in an inert organic compound which is liquid at the reaction temperature, and in the presence of a urea-process catalyst for phthalocyanine synthesis, the proportion of urea in the reaction mass being not less than 15 and not over 40 moles per mole of cupric chloride, the quantity of said organic liquid employed being sufficient to render the mass fluid for rapid agitation, and the reaction mass being subjected to vigorous agitation during the reaction, whereby to produce and maintain uniform distribution of the reactants in said organic liquid.

7. A process as in claim 6, the proportion of urea in the reaction mass being from 16 to 32 moles per mole of cupric chloride, and the catalyst employed being ammonium molybdate.

8. A process as in claim 6, the pigment formed being subjected to treatment with dilute aqueous acid during its recovery from the reaction mass.

References Cited in the file of this patent

UNITED STATES PATENTS

| | | |
|---|---|---|
| 2,197,459 | Wyler | Apr. 16, 1940 |
| 2,214,469 | Linstead et al. | Sept. 10, 1940 |

FOREIGN PATENTS

| | | |
|---|---|---|
| 464,126 | Great Britain | Apr. 12, 1937 |

UNITED STATES PATENT OFFICE
CERTIFICATE OF CORRECTION

Patent No. 2,910,482                                                  October 27, 1959

Hans B. Gottlieb

It is hereby certified that error appears in the printed specification of the above numbered patent requiring correction and that the said Letters Patent should read as corrected below.

Column 2, line 59, for "whole" read -- whose --; column 8, line 24, for "wase" read -- was --; column 9, line 6, for "basic" read -- basis --.

Signed and sealed this 5th day of April 1960.

(SEAL)
Attest:

KARL H. AXLINE
Attesting Officer

ROBERT C. WATSON
Commissioner of Patents